United States Patent
Kocher et al.

(10) Patent No.: US 11,568,695 B1
(45) Date of Patent: Jan. 31, 2023

(54) INFORMATION-BASED, BIOMETRIC, ASYNCHRONOUS ACCESS CONTROL SYSTEM

(71) Applicants: Robert William Kocher, McLean, VA (US); Douglas Earl Dyer, Herndon, VA (US)

(72) Inventors: Robert William Kocher, McLean, VA (US); Douglas Earl Dyer, Herndon, VA (US)

(*) Notice: Subject to any disclaimer, the term of this patent is extended or adjusted under 35 U.S.C. 154(b) by 0 days.

(21) Appl. No.: 17/682,208

(22) Filed: Feb. 28, 2022

Related U.S. Application Data

(63) Continuation of application No. 17/181,430, filed on Feb. 22, 2021, now Pat. No. 11,295,567.

(51) Int. Cl.
  *G07C 9/23* (2020.01)
  *G06F 21/32* (2013.01)
  *H04L 9/32* (2006.01)
  *G07C 9/25* (2020.01)

(52) U.S. Cl.
  CPC .............. *G07C 9/23* (2020.01); *G06F 21/32* (2013.01); *G07C 9/25* (2020.01); *H04L 9/3213* (2013.01); *H04L 9/3231* (2013.01)

(58) Field of Classification Search
  CPC .......... G06F 21/32; G06F 21/34; G07C 9/00; H04L 29/06; H04L 63/10; H04L 63/06; H04L 12/28; H04L 63/0861; B60R 25/00
  USPC ....... 340/5.52, 573.1, 517, 521, 5.6, 5.7, 5.8
  See application file for complete search history.

(56) References Cited

U.S. PATENT DOCUMENTS

| | | | | |
|---|---|---|---|---|
| 6,052,068 A * | 4/2000 | Price R-W | ............. | G07C 5/008 340/904 |
| 6,945,303 B2 * | 9/2005 | Weik, III | ................ | E05F 1/006 235/382 |
| 6,958,676 B1 * | 10/2005 | Morgan | ............... | G07B 15/063 340/928 |
| 7,898,385 B2 * | 3/2011 | Kocher | .................... | G07C 9/28 340/5.52 |
| 8,058,971 B2 * | 11/2011 | Harkins | .................... | G07C 9/21 340/5.5 |
| 8,254,631 B2 * | 8/2012 | Bongard | ................ | G07B 15/06 701/519 |
| 8,620,487 B2 * | 12/2013 | Cochran | ................ | G07C 9/257 340/5.82 |
| 8,629,755 B2 * | 1/2014 | Hashim-Waris | ... | G06Q 30/0601 705/13 |
| 9,003,196 B2 * | 4/2015 | Hoyos | ................ | G06Q 20/3223 713/186 |

(Continued)

*Primary Examiner* — Nam V Nguyen

(57) ABSTRACT

An information-based access control system for facilities. The control system includes a mobile app and securely connected central server, which is cloud-based. The app collects and transmits multiple biometric and other authentication factors and the facility enabling the server to verify identity and check to ensure the person is authorized to obtain access. If so, the server issues a limited duration approved biometric, which can be displayed to the facility guards, compared with a on-site image taken with a biometric sensor at the location, and used to control signal lights and electronic gates to obtain access quickly, conveniently, inexpensively, and securely. Also, a vehicle on the move can acquire access without having to slow down or stop if the biometric sensor can obtain an image inside the vehicle.

12 Claims, 4 Drawing Sheets

(56) References Cited

U.S. PATENT DOCUMENTS

| | | | | |
|---|---|---|---|---|
| 9,007,171 | B2* | 4/2015 | Yang | G05B 15/00 |
| | | | | 340/5.6 |
| 9,197,636 | B2* | 11/2015 | Varshavsky | H04L 9/3231 |
| 9,396,598 | B2* | 7/2016 | Daniel-Wayman | G07C 9/27 |
| 9,640,002 | B1* | 5/2017 | Grasberg | G07C 9/00174 |
| 9,990,787 | B2* | 6/2018 | Capaldi-Tallon | |
| | | | | G06K 19/06037 |
| 10,083,554 | B2* | 9/2018 | Mattern | G07C 9/257 |
| 10,229,548 | B2* | 3/2019 | Daniel-Wayman | G07C 9/23 |
| 10,475,264 | B2* | 11/2019 | Jin | H04W 12/00 |
| 10,505,938 | B2* | 12/2019 | Love | H04L 9/3226 |
| 10,769,873 | B1* | 9/2020 | Sun | H04L 9/3247 |
| 10,810,816 | B1* | 10/2020 | Kocher | H04L 9/088 |
| 10,997,808 | B2* | 5/2021 | Sun | H04L 9/088 |
| 2005/0149742 | A1* | 7/2005 | Weis | G07C 9/00563 |
| | | | | 713/186 |
| 2010/0306549 | A1* | 12/2010 | Ullmann | G07C 9/27 |
| | | | | 713/185 |
| 2013/0257590 | A1* | 10/2013 | Kuenzi | G05B 1/01 |
| | | | | 340/5.65 |
| 2014/0266585 | A1* | 9/2014 | Chao | G07C 9/27 |
| | | | | 340/5.61 |
| 2016/0308859 | A1* | 10/2016 | Barry | G06V 40/172 |

\* cited by examiner

INFORMATION-BASED, BIOMETRIC, ASYNCHRONOUS ACCESS CONTROL SYSTEM

CROSS-REFERENCE TO RELATED APPLICATION

This application claims priority from U.S. Non-Provisional patent application Ser. No. 16/806,503, filed Mar. 2, 2020, titled "Information-based Biometric, Asynchronous Access Control System" which claims priority from Ser. No. 16/350,247; titled "Information-based Biometric, Asynchronous Access Control System" filed on Oct. 19, 2018. This application also claims priority from U.S. Provisional Patent Application No. 62/765,174; titled "Information-based, Biometric, Asynchronous Access Control System" filed on Aug. 28, 2018; the contents of which are incorporated herein by reference, in their entirety.

FEDERALLY SPONSORED RESEARCH

None

BACKGROUND OF THE INVENTION

The invention relates to the field of providing access to a facility such as a military base, and in particular to an information-based, biometric, asynchronous access control system.

DESCRIPTION OF THE RELATED ART

Traditionally, access control for military bases is provided at a vehicle gate by guards checking ID cards. In operation, the guard checks the ID card of the individual seeking access in order to ensure that the ID card has not expired and is not an obvious forgery. The guard compares the photo on the ID card with the face of the person seeking access. This traditional method suffers from low throughput (less than 6 vehicles per minute, per lane); high costs of manual labor (1 guard per lane), and potential security holes (either through forged documents or stolen documents used by look-alikes). Document security measures and database checks improve some security issues while detracting from other security measures such as the time spent on photo-to-face comparison. Methods of identifying persons based on identifying the vehicle, including license plate recognition, vehicle barcodes, and biometric transponders result in errors from many sources, including failure to correctly identify the vehicle and tenuous association of a vehicle with the person or persons inside. Using such authentication methods to verify are problematic and ill-advised since none of these methods keep information confidential. Identification methods using license plates, vehicle barcodes, and biometric transponders may all be read at a distance and replicated by a determined adversary. Automated readers that scan the ID card are not secure since ID card barcodes may be easily read and replicated on forged documents. Document security measures may all be subverted by a talented counterfeiter with technology similar to the document publisher. Any semi-manual method that detracts from a biometric comparison such as the face-matches-photo determination is detrimental to security. Furthermore, introducing technical equipment for identity verification at a gate is usually very expensive and problematic for many reasons, including the need for environmental protection. Previous solutions also fail to capture information that would improve security, such as duplicate identities and normal access patterns.

An information-based approach similar to ones used for computer systems has the potential to improve security, increase throughput, and lower costs through automated checking, in addition to enhancing convenience for users. Multi-factor authentication is more secure and effective for verifying identity, and biometrics such as face, are particularly convenient for the user and are accurate based on current facial recognition and other biometric algorithms. An adversary hoping to gain access to the facility would need to have known the user's secrets (like personal identification number [PIN]), have objects identical to the user's objects (like mobile device and biometric), and appear to be the user (biometrics such as face) are very hard to achieve. Using both a mobile app and the user's own mobile device, and a biometric such as a face photo can be collected and information transferred without great cost of new equipment. Using a central server, enrollment information may be combined with current threat conditions, facility-specified authorized personnel, and analytical algorithms to tailor authentication requirements and access control. By permitting users to request and receive access decisions before arriving at the gate (asynchronously), less time is required to get through the gate, reducing traffic backups and saving everyone time. Security guards can spend more time on physical security threats and exceptions thanks to automated authentication and access control. Fewer security guards may be required, thus reducing labor costs. By avoiding technologies that don't add value, the system can be relatively inexpensive.

SUMMARY

To improve security, reduce manual effort, human errors, and increase throughput, a smart phone app and central server can work in conjunction to securely verify identity and check that the person is authorized to gain access to the facility; and the server can provide a limited-duration access biometric or biometrics enabling the user to gain access to bases, buildings, or security programs. This process can occur prior to arriving at the gate. building or other secure area, reducing the time needed at the gate and increasing throughput so traffic does not back up, and will reduce the time waiting at a building entrance or meeting venue. Upon entry, the access biometric can be displayed or transmitted to satisfy guards or, using an on-site biometric sensor, algorithmically compared to an on-site biometric image to actuate access control equipment such as signal lights, electronic gates, or any access control system. Security is improved because, depending on policy and a desire for user convenience, 1, 2, 3, or more authentication factors may be used to verify identity, and all system information is kept confidential via encryption and other information assurance methods. With automation, the guards have less distracting labor and can better focus on physical security threats and exceptions. Because the central server has a database, it's easy for facilities, buildings, or physical venues to limit access to particular people, and all access data are recorded and potentially analyzed to obtain insights and further improve the security of the facility. Because the solution can reuse infrastructure already available, including individual's smart phones and their network connectivity; great benefits are achieved without great cost. In another exemplary embodiment, as shown in FIG. 2, in addition to the multiple types of authentication of a person seeking access to a base, an biometric device in the vehicle of the person seeking access to the facility transmits a biometric tag to a biometric reader located at a gate of the facility that the person seeking access is approaching. The received biometric tag, along with the authentication information can both be verified at an access control center at a cloud server; wherein the person seeking access can be granted access to the facility without having to stop at the gate. According to another exemplary embodiment of the invention, a verified access to a facility or venue is provided. In this exemplary embodiment, a controlled access building, room, venue, or meeting is provided. The invention provides an access biometric on the mobile device on subject requesting entry. This access biometric can be compared to an on-site image taken using an on-site biometric sensor and then algorithmically compared to an on-site biometric image to satisfy facility guards using an access light or indication to the guard to allow or decline entry, One of the fundamental innovations of this exemplary embodiment of the invention is ensuring the subject user is properly a subject for entry through multiple factors of authentication; including, but not limited to facial recognition, personal identification number/code (PIN), physical biometric of a mobile device, and electronic encryption codes.

The verification is made at a central location and sent out to a facility as a time-based access biometric; and the same access biometric is sent to the subject's mobile device. The subject presents his mobile device to an electronic reader or guard for verification based on algorithmic comparison using an on-site biometric sensor image.

LIST OF THE REFERENCE NUMERALS FOUND IN THE DRAWING

Figure 1:
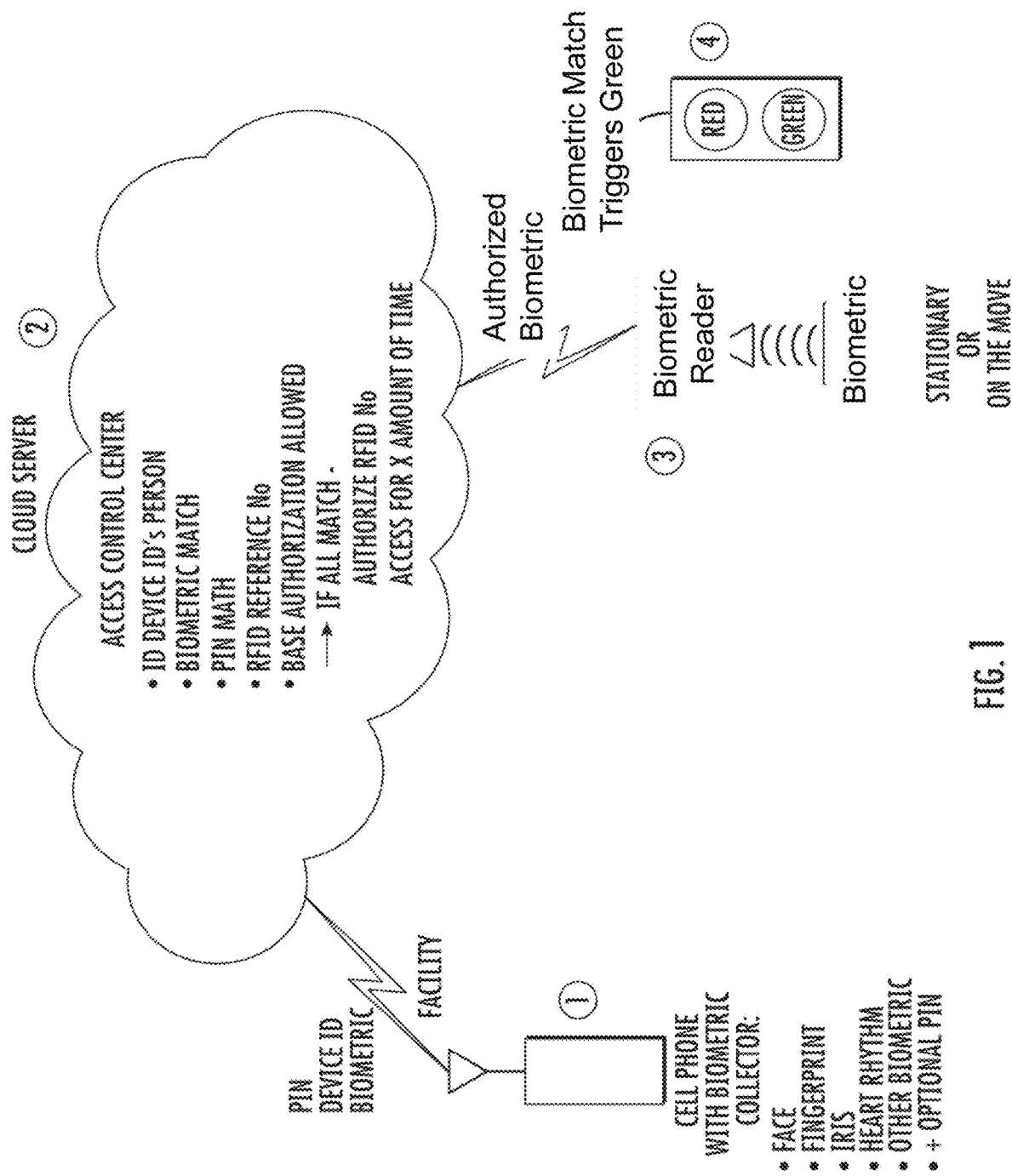
FIG. 1 illustrates an exemplary view of the primary components of the system.

1 Mobile device such as a smart phone
2 Cloud server
3 biometric reader
4 Signal light
5 Director is a computer which signals drivers into or out of the Pre-Pass lane
6 Verifier which represents a set of equipment used to verify that a vehicle in the Pre-Pass lane should be admitted through the gate
7 biometric-D represents a computer equipped with an biometric reader
8 Pre-Pass lane which is a traffic lane designed for on-the-move, secure vehicle access.
9 Normal lane which is a traffic lane for general purpose access.
10 biometric-V which is a computer equipped with an biometric reader and a vehicle sensor 11.
11 VS represents a vehicle sensor.
12 A represents an arrow light with 2 arrows used to direct drivers to stay in the Pre-Pass lane 7 or move to the normal lane 9.
13 is a red light/stop light.
14 is a gate of the facility.
15 is a car(s) that does not qualify for the Pre-Pass Lane.
16 is a car(s) that does qualify for the Pre-Pass Lane.
17 is the Arrow Verification biometric Reader.
18 An arrow, light with one or more arrows used to direct drivers to use the Pre-Pass Lane
19 Director biometric reader
20 Mobile phone or other device
21 Base Authorized Access Center
22 Verification biometric Reader
23 Security guard
24 Pre-Pass Lane
25 Standard Access Lane
26 Standard Access System is an external system of some kind which is not part of the invention but may provide security-related information for drivers in the Standard Access Lane (25)
400 Central Server
405 Request for an access code
410 Mobile device
411 Individual's biometric collected at location using on-site biometric sensor
415 Receipt of an access code by mobile device 410
420 Sending of an access biometric
425 Base gate or installation access
430 Sending of an access biometric
435 Building access
440 Requesting a access biometric
445 Receiving a access biometric
450 Sending of a access biometric to a meeting or venue access 455
455 Meeting or venue access

DETAILED DESCRIPTION OF THE EXEMPLARY EMBODIMENTS

The components of FIG. 1 include an app running on a mobile device such as a cell phone 1. The cell phone illustrated includes a communications network for transmitting biometric information such as an image of a person's face; a fingerprint, a picture of a person's iris; the heart rhythm of the person; other biometrics and an optional pin number. The central server in the cloud 2 includes network connectivity and running programs including a database and access control (software) server. The biometric reader 3 communicates with the cloud server 2 receiving an approved, authorized biometric. The biometric reader 3 is placed at or near the gate 14 and interacts with vehicles which are stationary or on the move. Access control equipment 4 includes control equipment such as signal lights and is in communication with biometric reader 3. Information-based access control includes three activities: (1) authenticating, or verifying the identity of the person seeking access, (2) authorizing, which verifies that the identified person should have access according to the facility policy, and (3) acting to communicate and facilitate access through signaling ("green light" if access is granted or "red light" if access is rejected) and also opening/closing electronic gates. Of these, the first activity, authentication, is most difficult.

Authentication begins with a claim of identity and includes evidence that can be used to decide whether the claim is true. Ideally, authentication evidence is provided in several different and independent ways, such as something you know (a secret other people do not know such as a computer password or PIN); something you have (an object that belongs only to you); and something you are (a biometric that differentiates you from others). A common example of authentication is when you log in to your computer. Your user name is a claim of identity—the computer account associated with you. Your password (something you know) is one item of evidence that your claim is true. When you log in, your computer checks your password, and if it matches the known password for your account, then the computer allows access. Some computers are set up to require two-factor authentication that includes both a password (something you know) and a time-based on-time-PIN from a smart phone app which shares a secret with a server.

Two-factor authentication is better evidence that your claim of identity is correct because the two factors are more-or-less independent of one another. Someone could crack your password but they would not have your phone or access to your time-based on-time-PIN and as a result could not obtain access. For reasons like this, two-factor authentication is regarded as more secure than a single factor like a computer password. It's possible to have three-factor authentication or use even more factors if desired. Humans, being fallible, make mistakes such as forgetting passwords, choosing passwords that are easy to guess, or writing down passwords so that others might find them; losing objects; failing to follow instructions; and rejecting procedures for reasons of inconvenience even when failing to follow instructions increases security risks. A good access control system works despite human failings, takes advantage of new technologies as they become available, and use all available evidence to make good decisions in order to optimize convenience, throughput and security. When conditions change, the security system should be able to adapt quickly; for example, in response to a threat increasing, perhaps the number of required authentication factors increase and authorizations could change.

Traditional access control based on ID card checks provides only a document as authentication evidence, and documents may be forged or stolen. In contrast, information-based access control is based on a central database which is easier to secure and manage in addition to being faster to update; thus improving security in response to changing conditions. The central server has a database that includes both authentication and authorization information. If desired, the central database can also automate access decisions and provide control signals to signal lights, gates and other access control equipment. Of course, a network is required to connect the database to these field elements, but networks are now ubiquitous. For example, any security gate lacking network connectivity may be connected via a cellular hot spot for about $30/Month, and the bandwidth provided is sufficient because control information is quite compact. An alternative to a network is to distribute the database through the use of Distributed Access Cards (DAC). The DAC is one example of a security card for a distributed database. A DAC satisfies the requirement for two-factor authentication: something the user knows combined with something the user has. But the economics favor centralization and dependence on a network.

Authorization is based on the role of the person identified in authentication. Authorization is a policy that may be changed according to the dynamic situation. Once identity is authenticated, making access decisions based on authorization is rather trivial and will be correct so long as policy is kept up-to-date. After authentication and authorization checks, there is sufficient information to decide and act upon. If a person successfully authenticates and has adequate authority, then the decision is to grant access. In this case, the system must support communication necessary to act in support of access. Typically, this includes notifying the guard as well as the person seeking access and providing control signals to open a gate. If there is good synchronization, then the system might provide these actions directly. Alternatively, the system can support asynchronous service by providing the person requesting access with a biometric that can be used to inform the guard, be compared with the person using an on-site biometric sensor and biometric comparison algorithm, and control on-site access control equipment for appropriate response.

An information-based access control system that operates synchronously works in this way. A person wishing access sends a claim of identity with one or more authentication factors that provide evidence that the identity is correct. In addition, the person includes the particular facility where access is desired. The system considers the information, comparing it with known information in a database to verify identity and determine if the person is authorized access by the facility, then provides an access determination to security personnel and a biometric reader in the form of an approved, authorized biometric. When the person arrives at the access control point for the facility, such as a vehicle gate or pedestrian door, a biometric reader uses a sensor to take an image, comparing it to the approved, authorized biometric received from the server. Depending on the outcome of the comparison, the biometric reader signals the guard and controls automated access control equipment such as signal lights and electronic gates, permitting access if the biometrics match. All communications and devices are secure and provide basic information assurance. Because the system is operating synchronously, all these actions must occur at the access control point as each vehicle or pedestrian approaches; no vehicle or pedestrian can begin the process before the vehicle in front completes the process and is admitted through the gate (or rejected).

Practically, the system can also operate asynchronously since there are often multiple vehicles entering the gate at once and because it saves time to be approved for access before a user arrives at a gate. This changes the design only slightly. In the "green light" case in which the person is to be permitted access, the system issues an access biometric to the person seeking access and also to the security personnel and biometric reader. Because biometrics are supplied asynchronously, the security personnel and access control equipment will, in general, have a set of expected biometrics. When a person seeking access arrives at the gate, they present their biometric, and if it is in the set of expected biometrics, access is provided. That particular biometric is removed from the set shortly afterwards to prevent covert reuse.

One benefit of this design is that the person seeking access knows immediately if they have access and can correct a problem (e.g. via a new access request) or be prepared to request a secondary security protocol.

There are many ways to provide information and receive an access biometric. The simplest, most reliable, inexpensive, and most convenient way is to use an app on an Android or iOS smart phone. According to the Pew Research Center, as of 2018, more than 90% of 18-49-year-olds in the US have a smart phone; a figure that has been increasing every year. Smart phones are essentially computers with many built-in peripherals (e.g. GPS, camera), a USB connector for attaching external peripherals (e.g. fingerprint or iris scanner or other biometric device), and near-continuous connectivity to a digital network. They protect data by securing both data at rest and data in transit. It's easy for a user to download an app, set it up during enrollment, and use it to securely authenticate and receive an access biometric.

In an embodiment for vehicle access, the on-site biometric reader is located inside the person's vehicle and is triggered to obtain an on-site biometric image using a location sensor as the vehicle approaches the access control point. In another embodiment for pedestrian access, the app on the user's mobile device is similarly triggered to obtain an on-site biometric image using the location sensor of the mobile device as the person approaches the access control points. In other embodiments, the biometric sensor for the on-site biometric reader is associated with the access control point rather than the person. In another embodiment, the approved, authorized biometric sent from the server also includes a time window limiting the duration during which the approved, authorized biometric is valid for obtaining access.

The operation of an exemplary embodiment is to enroll and set up the smart phone app. Assuming network connectivity, the user enters their identity in the form of a Unique ID Number, presses a button to take a face photo or other biometric (this step may be repeated as needed), presses a button to take a photo of their issued ID card (this step may be repeated as needed), enters a unique PIN for access and also a PIN for a distress code (to be used to summon help in the case of coercion), then presses a button to enroll. Enrolling securely sends the Unique ID Number, face photo or other biometric, and ID card photo, and PINs to a server which takes several steps to verify the user's identity. The system obtains the ID card photos from a database and compares the face photo submitted using a facial recognition algorithm and a policy-established similarity threshold (or, similarly for an alternative biometric). If there is sufficient uncertainty in the facial similarity, the face photos are provided to a trained facial examiner for determination (in which case, the user must wait until the determination is made; and similarly for an alternative biometric). The system also analyzes the ID card photo for any signs of forgery.

If the system's analysis verifies the user's identity and ID card, the system responds with a unique secret or key that it now associates with that user by saving it on a server. The user's app saves the shared secret or key in an encrypted file along with the user's DOD ID Number. The shared secret or key will be used, in the future, to create a time-based one-time PIN (TOTP) to provide one factor of authentication (something you have, namely, your phone). This is analogous to Google Authenticator and similar apps used for two-factor authentication in computing. Enrollment is now complete (estimated time: 2 minutes).

To use the app for vehicle access, the user starts the app when their vehicle is stopped near the gate of the access control point. The app may be started normally or using voice commands ("OK Google, open InSec"). The user presses a button in the app and then looks at the phone's front camera. The app takes a face photo (something you are), then sends the access request over a secure HTTPS connection to the server. The request includes DOD ID Number, TOTP, face photo, and the location of the facility. The server verifies the TOTP (user's phone) and face photo (user's face, via a facial recognition algorithm) for the DOD ID Number, and checks the user's authorization for the facility. Upon success, the server returns an approved, authorized biometric to the user and forwards it to security personnel and the biometric reader(s) at the gate. This process takes 2-3 seconds. Upon arriving at the gate, the user presents themselves so that an on-site biometric image can be taken and compared with the approved, authorized biometric to gain access. If the two biometric images fail to match, access is denied, and the user is shunted to a secondary protocol. Otherwise access is granted, and the person's approved, authorized biometric is removed from biometric reader shortly afterwards, to prevent nefarious reuse.

Not shown in FIG. 1, but understood to exist are software components, the actual hardware server in the cloud and a local computer at the facility gate which reads the biometric codes from the biometric reader and controls the access control equipment, which might include an electronic gate in addition to signal lights, like a stoplight. The cell phone is a smart phone with built in peripherals such as a camera and GPS and includes an USB interface to support connection to external devices such as other biometric readers for collecting biometrics other than face; such as fingerprint, iris, heart rhythm or other biometric. Software in a smart phone app enables initial enrollment and day-to-day access requests and access biometric receipt. The cloud server includes one or more biometric recognizers such as facial recognition in addition to system software. In an embodiment, the biometric reader is connected to a local computer at the facility which is able to receive access biometrics and associated biometric codes from the server. A signal light is also connected to the local facility computer which controls the signal light.

The information-based, biometric, asynchronous access control system described greatly improves security, convenience, and throughput over current methods based on ID card checks. Because it is based on ubiquitous mobile devices, it achieves these advantages at low cost. The system described is flexible and adaptable so that it can take advantage of new technologies as they arise, and change the authentication factors and authorizations as the threat conditions change at the facility.

Figure 2:
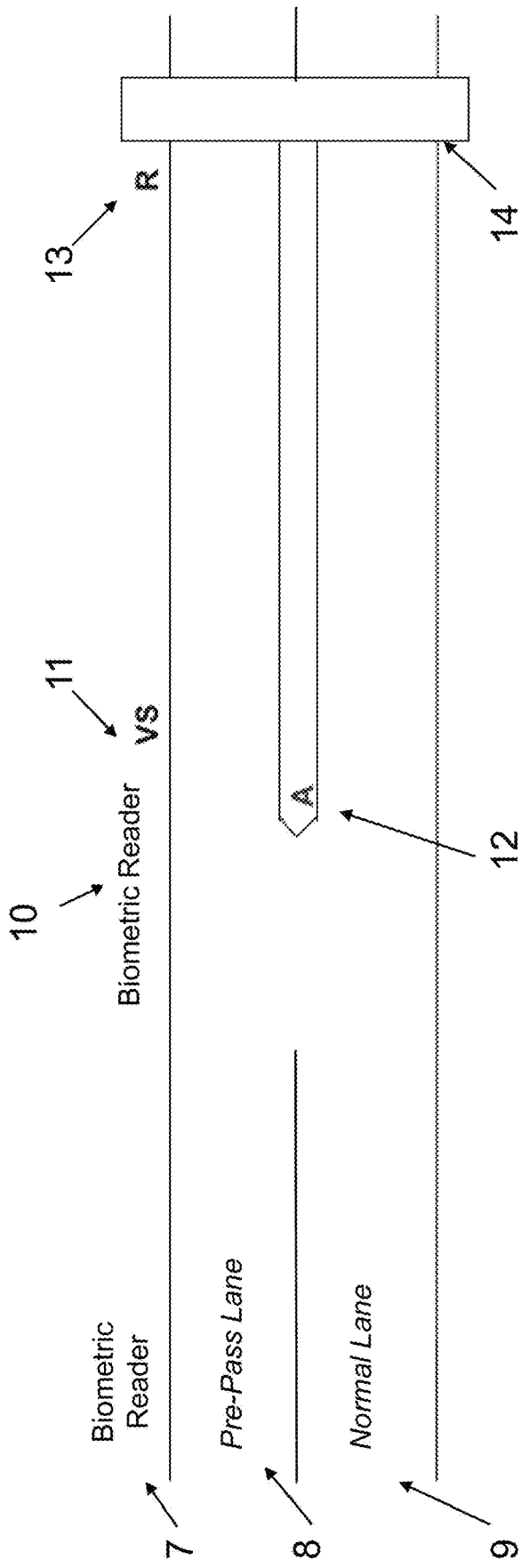
FIG. 2 illustrated an additional exemplary embodiment relating to on-the-move vehicle access.

Turning to FIG. 2, this figure illustrates another exemplary embodiment of the invention, Essentially, the invention uses the approved, authorized biometric which has been activated for some period of time by virtue of a central server or computer (a national access control center (NACC) server) receiving an access request from a user (which includes the user's ID number, the user's PIN, the user's phone time-based PIN, and the user's face photo plus the desired location) and, if that access request, after checking, is made by an authenticated and authorized user, the central computer replies with a confirmation—an access control secret with the user's ID number. The server sends the approved, authorized biometric as confirmation and, in an embodiment, a time window back to the user and also to biometric reader(s) at the access control point. If the user shows up at the access control point inside the time window, the biometric reader(s) obtain a biometric image of the user at that time and compare it with the approved authorized biometric from the server. Depending on the result of biometric comparison, the biometric readers effects access control equipment to permit entry. The access control equipment includes lane signal lights, a stop light, and an audible alert. There can also be a boom gate or other equipment used to physically stop the car when access is denied.

One aspect of vehicle access on-the-move is vehicle safety in the context of an on-the-move Pre-Pass lane 8. It is possible that a driver without access will be in the specially designated on-the-move Pre-Pass lane 8. The driver may not have access if they are not enrolled or forgot to request access or a received access but the access time window has expired. Whatever the reason, that driver should safely leave the specially designated on-the-move Pre-Pass lane 8 for the normal lane 9 where another access protocol will be used (e.g. a manual ID card check). To support safe, smooth, vehicle operations, in this exemplary embodiment, director biometric reader 7 that checks the associated driver's status, finds no biometric match, and sets a lane arrow light 12 accordingly, directing a driver without access to a normal lane for manual processing to maintain high throughput in the on-the-move lane. In contrast, a driver with access will result in director biometric reader 7 finding a biometric match which will cause it to set the lane arrow light 12 to indicate that the driver should, remain in the on-the-move Pre-Pass lane for access.

Another aspect is ensuring security. If a driver without access ignores the arrow lights 12 and inappropriately remains in the designated on-the-move lane 8, a vehicle sensor 11 detects the vehicle and, triggers a check to see if a second biometric reader 10 has found a driver with access. If not, the biometric reader 10 causes other access control equipment 13 to stop the driver and alert security guards. That other access control equipment might be a traffic light and/or a boom gate (which drops its arm to stop the vehicle). Alerting the guard can be done audibly (for example, a school bell) or using a graphical alert on a guard's workstation. In contrast, a driver with access will result in biometric reader 10 finding a biometric match and controlling access control equipment to permit access for that driver.

As shown in FIG. 2, an exemplary embodiment of a two-lane system which has a Director 5, which is a set of equipment used to direct drivers into the Pre-Pass lane 8 or out of the Pre-Pass lane 8 and into the normal lane 9, as is appropriate. The equipment includes a director biometric reader and arrow signal lights 12. In this exemplary embodiment, the two-lane system also includes Verifier 6 which is a set of equipment used to verify that drivers in the on-the-move Pre-Pass lane should or should not be permitted access. The Verifier 6 includes the verifier biometric reader 10, the vehicle sensor 11, and access control equipment 13 at the gate 14 of the access control point.

In an embodiment of FIG. 2, the approved, authorized biometric sent by the server includes a time window during which it is valid. If the driver arrives at the access control point too early or too late, then the director biometric reader 7 will use arrow signal lights 12 to direct the driver out of the on-the-move Pre-Pass lane 8, and if the driver remains in the on-the-move Pre-Pass lane 8, then the verifier biometric reader 10 will sense the driver's vehicle using the vehicle sensor 11 and use access control equipment 13 to stop the driver.

Figure 3:
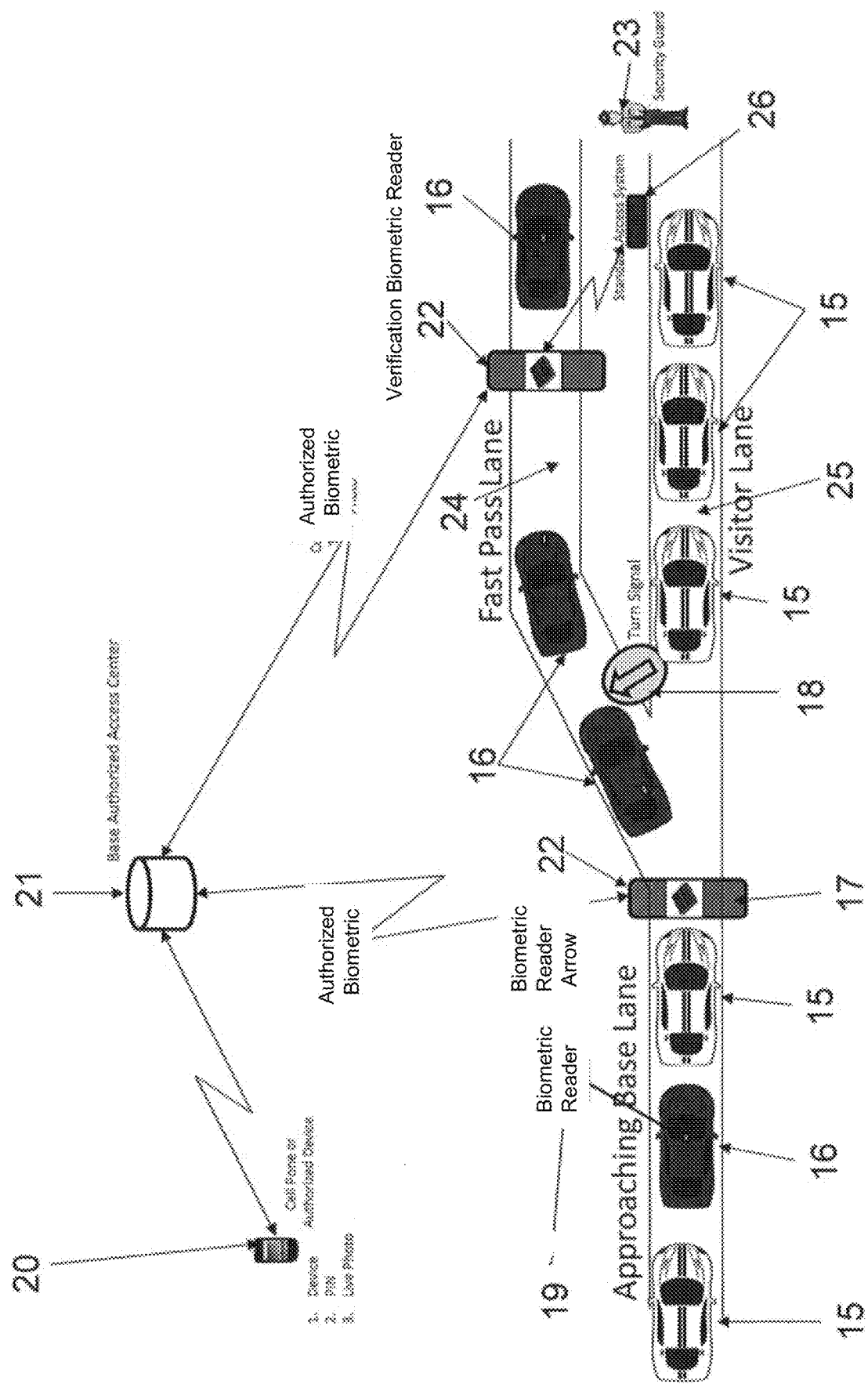
FIG. 3 illustrates an additional exemplary embodiment relating to a single lane approach a base that will further divide into a Fast Pass Lane in addition to the standard access lane.

The embodiment of FIG. 3 depicts several of the invention elements, linkages, and processes for the system. In particular, FIG. 3 depicts a configuration where a Fast Pass Lane, element 24 is built to allow the bypass of the Visitor Lane, element 25. Cars and drivers, elements 16, intending to use the Pre-Pass Lane element 24 who have enrolled, requested access by providing authentication factors, element 20, are checked for identity and authorization to a facility and received an approved, authorized biometric as confirmation from a server at the Base Authorized Access Center 21, indicating they will be permitted access.

The Biometric Reader Arrow, element 17, is a computer equipped with an biometric reader. The computer receives approved, authorized biometrics from a central server at the Base Authorized Access Center, element 21, and can check to see if an biometric read from a vehicle corresponds to a confirmation. If so, this computer will use arrow signal light element 18 to signal the driver to use the Fast Pass Lane 24. If not, this computer will use the arrow signal light 18 to signal the driver to remain in or change to the Standard Access Lane element 25.

The arrow signal light 18, with one or more arrows, is used to direct drivers to use the Face Pass Lane 24 or to the Visitor Lane 25. This arrow light is controlled by computer Arrow Verification biometric Reader 17.

In an embodiment, an biometric reader, element 19, associated with a driver, is optionally mounted inside the driver's car or otherwise readable by a the Biometric Reader Arrow 22 and Verification Biometric Reader 22 by providing a clear biometric image through automotive glass.

The Base Authorized Access Center 21, a data center, perhaps with human experts, that has connectivity with every driver's device and also with computers associated with every biometric reader at a base or other secure facility including the Biometric Reader Arrow 17, and Verification biometric Reader 22.

The Base Authorized Access Center 21 is authorized by a base or other secure facility to determine the identity of drivers requesting access and to check to see if drivers should have access according to policy set by the base or other secure facility. This data center receives access requests from drivers, verifies the driver's identity and checks to see if the driver is authorized to visit, and if so, sends an approved, authorized biometric as a confirmation to the driver and to biometric readers such as the Biometric Reader Arrow 17, or the Verification Biometric Reader 22. In an embodiment, other security-related information is also sent such as the driver's identity number, rank or title, and photo.

The Verification Biometric Reader 22, is a computer equipped with an biometric reader and a vehicle sensor. The computer receives confirmations from the Base Authorized Access Center element 21, senses vehicles passing, and can check and see if an biometric code read from a vehicle corresponds to the approved, authorized biometric sent from the Base Authorized Access Center 21 If a vehicle passes the Verification biometric Reader, element 22, and a on-site biometric image does not, match the approved, authorized biometric, then the Verification Biometric Reader 22, will use access control equipment to stop the driver and trigger an audible alarm such as an electric bell to alert a Security Guard 23. These actions should result in stopping a driver who does not have access. The stopped driver will interact with a Security Guard 23, who will provide further instructions. If a vehicle passes the Verification Biometric Reader 22 and the two biometrics match, then the Verification Biometric Reader 22 takes no action, permitting secure access through a gate via the Pre-Pass Lane, element 24.

A security guard, element 23, who can optionally have access to a workstation displaying useful information such as the photo of a confirmed driver 16, passing by in the Pre-Pass Lane 24, and who may also have access to an external system used for managing other, non-confirmed drivers 15, in the Standard Access Lane element 25.

The Pre-Pass Lane, element 24 is a traffic lane designed for on-the-move, secure vehicle access through a gate by access-confirmed drivers depicted as dark vehicles 16.

Standard Access Lane, element 25, is a traffic lane for general purpose access through a gate in which security is ensured using some other mechanism such as a manual ID card check by a guard 23, perhaps with an external system 26, and for drivers not intending to use the P e-Pass Lane 24, depicted by white vehicles 15.

Figure 4:
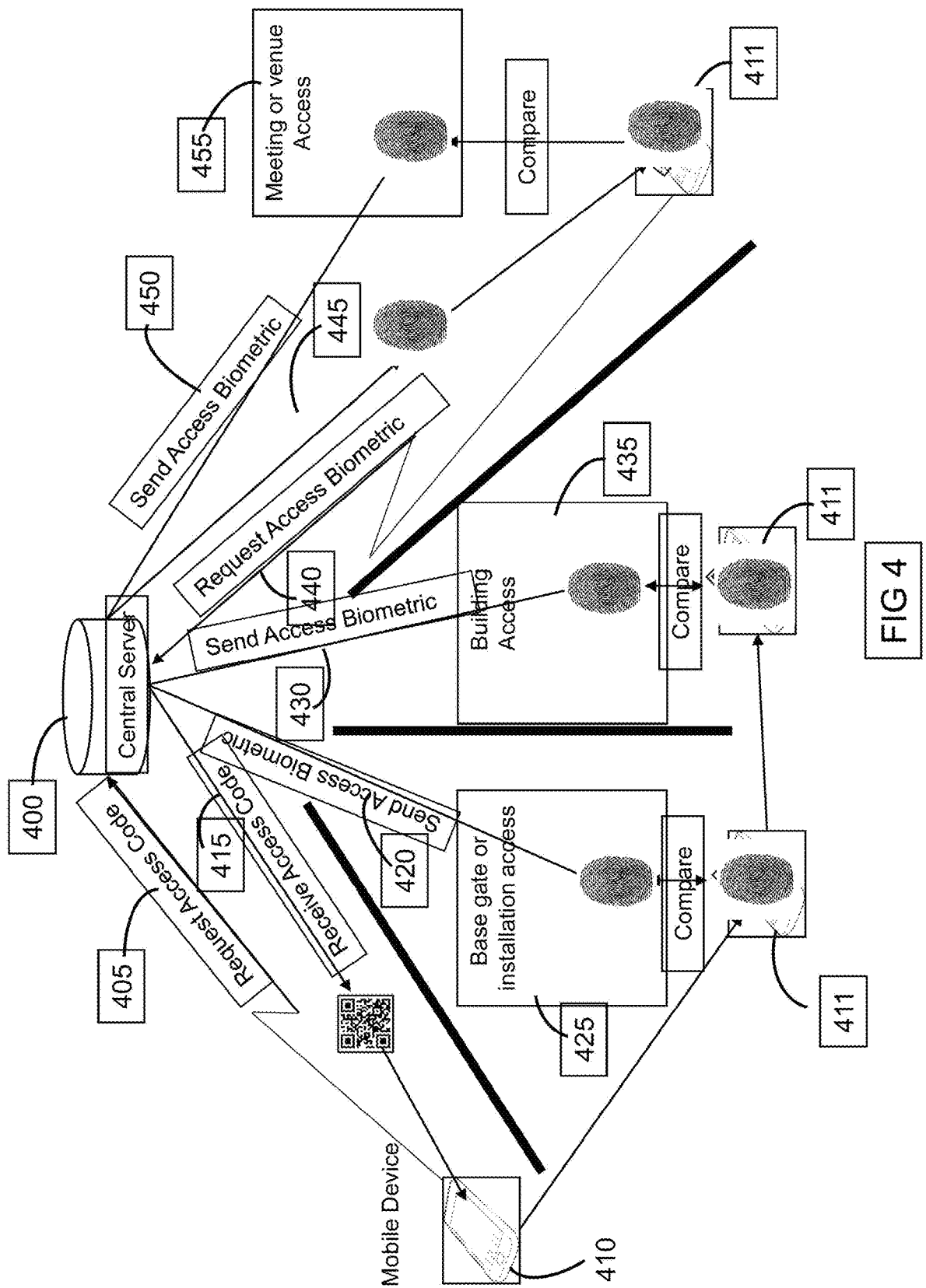
FIG. 4 illustrates an additional exemplary embodiment relating to the individual seeking access to a meeting or access to a specific venue to request and receive access based on biometric comparison.

FIG. 4 is an alternate embodiment of the invention. According to the exemplary embodiment of FIG. 4 of the invention, a verified access to a facility or venue is provided. In this exemplary embodiment, a controlled-access building, room, venue or meeting is provided. The invention provides an access biometric on the mobile device upon subject requesting entry. This access biometric, such as, but not limited to a fingerprint image or template or face image or template, can be displayed to the facility guards and a biometric reader to provide an access light or indication to the guard to allow or decline entry. As illustrated in FIG. 4, a central server 400 is provided. A subject's mobile device 410 sends a request for access to a installation, building or meeting venue to central server 400. In response, if eligible for entry, an access code 415 is sent by the central server 400 to the subject's mobile device 410 to indicate to the user that access will be permitted. In addition, the central server 400 sends an access biometric 420 to the base gate or installation access area 425, which, upon arrival by the user, compares and on-site biometric image 411 to the access biometric 420. Alternatively, for access to a building 435, the central server 400 sends an access code 430 to a to building access area 435 which, upon arrival by the user, compares and on-site biometric image 411 to access biometric 430 and determines whether there is a match. Upon a match being determined, the subject is permitted access to the building.

In the event that a subject seeking entry or individual seeks to enter to attend a meeting or a specific venue, the individual sends a request for a special access code 440 from their mobile device 410 to the central server 400. If the individual is permitted entry to the meeting or venue, the central server sends receive special access code 445 to the individual's mobile device 410, and also sends a special access biometric 450 to the meeting or venue access location 455 At the location 455, a comparison is made between the on-site biometric of the user 411 and the access biometric 450. If the comparison matches, access is appropriate and the individual with the mobile device is permitted entry.

One of the fundamental innovations of this exemplary embodiment of the invention is ensuring the subject user is properly a subject for entry through multiple factors of authentication including, but not limited to facial recognition, personal identification number/code (PIN), physical biometric of a mobile device, and electronic encryption codes.

In an embodiment, the access code 415 is also checked before permitting access to a base gate 425, building 435, or meeting venue 455. In an embodiment, the access code appears as a barcode on the user's mobile device 410. The user presents his mobile device to an electronic reader or guard for verification.

It should be understood that the foregoing relates only to preferred embodiments of the present invention and that numerous modifications or alterations may be made therein without departing from the spirit and scope of the invention as set forth in the appended claims, as would be understood by one of ordinary skill in the art. Such alternate embodiments are considered to be encompassed within the spirit and scope of the present invention. Accordingly, the scope of the present invention is described by the appended claims and supported by the foregoing description.

What is claimed is:

1. A method for allowing physical or logical access of an individual to a meeting, facility or venue, the method comprising of the following steps related to enrollment and access:

steps relating to enrollment include:
obtaining an enrollment biometric of the individual on a mobile device associated with the individual;
logging into a central server, having authoritative biometric images for all individuals, utilizing said mobile device;
providing said central server with an enrollment biometric from the individual using said mobile device;
verifying the individual enrolling on said central server using a biometric comparison algorithm, said enrollment biometric, and one of said authoritative, biometric images that is available on the server;
generating a unique code tor said mobile device by said central server;
storing said unique code for said mobile device on said central server;
providing an enrollment confirmation message with said unique code from said central server to said mobile device that enrollment is complete for said verified individual;
storing said unique code on said mobile device;
steps relating to access include:
obtaining an access biometric of the individual on said mobile device;
communicating an access request to a specific location by said enrolled individual with said mobile device to said central server, by providing the access biometric;
verifying an identity of the individual on said central server using the biometric comparison algorithm, said access biometric, and one of said authoritative biometric images available to the server;
authorizing access of said individual to requested said specific location, for an authorized time period set by security policy, by said server;
transmitting from said central server a visit request confirmation number with said authorized time period for said specific location to said mobile device;
transmitting, also, from said central server to a computer at said specific location said visit request confirmation number, said authorized time period, and said unique code for said mobile device associated with said individual;
receiving, by said computer from said mobile device, one or more global positioning system (GPS) location updates at particular times with said unique code for said mobile device as said individual approaches said specific location;
verifying, by said computer, received visit request confirmation number associated with said unique code for said mobile device associated with said individual;
verifying, by said computer, said specific time is within said authorized time period;
verifying, by said computer, said specific location updates at said particular times transmitted by said mobile device to the specific location; and
permitting said individual access to said specific location upon valid verification of said visit request confirmation number, said specific time, and said specific location.

2. The method of claim 1, wherein the access biometric is one or more of a facial image, fingerprint, an image of the person's iris, and the person's heart rhythm.

3. The method of claim 1, further including a personal identification number (PIN) is provided by the individual during enrollment, saved by the server, and used an additional authentication factor by the server to verify the individual during access requests.

4. The method of claim 1, wherein the central server is operating in an internet cloud.

5. The method of claim 1, further including, in the special access request, a time-based one-time password (TOTP) from an individual's mobile device based on a TOTP key provided by the central server to the mobile device as part of a confirmation message at the end of enrollment.

6. The method of claim 1, wherein the visit request confirmation includes an access code is also transmitted by the central server to individual's mobile device and the computer at the requested specific location, and used, in addition to biometric comparison, to determine if entry should be permitted.

7. The method of claim 1, wherein the access biometric is represented as a bar code.

8. The method of claim 1, wherein the specific location is a building, and entry is through a door.

9. The method of claim 1, wherein the specific location is an area, and entry is through a gate.

10. The method of claim 1, wherein the specific location is a meeting room, and entry is through a door.

11. The method of claim 1, wherein the access biometric provided by the central server is the authoritative biometric image.

12. The method of claim 1, wherein the access biometric provided by the central server is the access biometric communicated in an access request to the specific location by said enrolled individual with said mobile device to said central server.

* * * * *